United States Patent [19]
Peterson

[11] Patent Number: 4,583,095
[45] Date of Patent: Apr. 15, 1986

[54] RADAR SEISMOGRAPH IMPROVEMENT

[76] Inventor: Glen Peterson, 540 S. 83 E. Ave., Tulsa, Okla. 74112

[21] Appl. No.: 525,438

[22] Filed: Aug. 22, 1983

[51] Int. Cl.[4] ............................................. G01S 13/00
[52] U.S. Cl. .................... 343/5 NA; 324/330; 324/337
[58] Field of Search ............ 343/5 NA; 324/330, 337, 324/323; 367/37, 14, 36; 340/15.5 C

[56] References Cited

U.S. PATENT DOCUMENTS

| | | | |
|---|---|---|---|
| 1,045,575 | 11/1912 | Löwy | 367/36 |
| 1,492,300 | 4/1924 | Löwy | 367/14 |
| 2,054,067 | 9/1936 | Blau et al. | 367/14 |
| 2,077,707 | 4/1937 | Melton | 367/14 |
| 2,148,679 | 2/1939 | Blau et al. | 367/14 |
| 2,156,259 | 5/1939 | Blau | 340/15.5 C |
| 2,354,659 | 8/1944 | Bazaw et al. | 324/323 |
| 2,636,924 | 4/1953 | Lundberg et al. | 324/330 |
| 2,652,530 | 9/1953 | Davidson | 324/330 |
| 2,717,656 | 9/1955 | Bannister | 367/14 |
| 2,805,727 | 9/1957 | Bazhaw | 324/323 |
| 3,292,728 | 12/1966 | Ehrlich | 367/37 |
| 3,351,936 | 11/1967 | Feder | 324/330 |
| 3,392,327 | 7/1968 | Zimmerman, Jr. | 324/323 |
| 3,509,960 | 5/1970 | Hamilton | 367/37 |
| 3,524,129 | 8/1970 | Ikrath | 324/323 |
| 3,665,466 | 5/1972 | Hibbard | 324/330 |
| 4,218,678 | 8/1980 | Fowler et al. | 367/37 |

Primary Examiner—Thomas H. Tarcza
Assistant Examiner—Mark Hellner
Attorney, Agent, or Firm—Head, Johnson & Stevenson

[57] ABSTRACT

The technologies of radar, exploration seismology, and air or space transportation, are combined to provide a highly-mobile and economical system of geophysical exploration for petroleum and other mineral deposits. Use is made of the Seismo-electric (SE) and Electroseismic (ES) effects to momentarily alter the reflection and scattering from, and absorption in, the earth's surface, of electromagnetic (radar) waves transmitted from, and received by, an aircraft or space vehicle, to thereby modulate seismic information on the reflected, scattered and received waves. In this improvement, the received waves, as represented by their transduced electric counterparts, are divided into two paths having different times of transmission, and synchronously recombined to enhance systematic or meaningful information and remove non-systematic disturbances and random noise.

20 Claims, 6 Drawing Figures

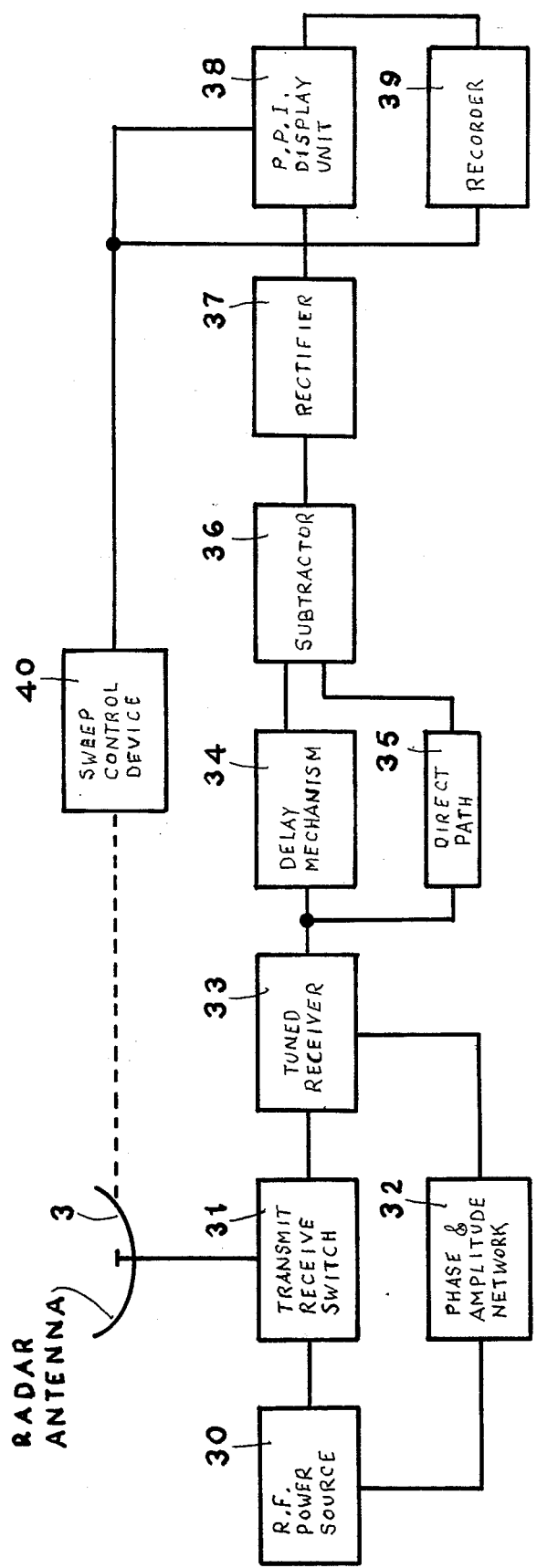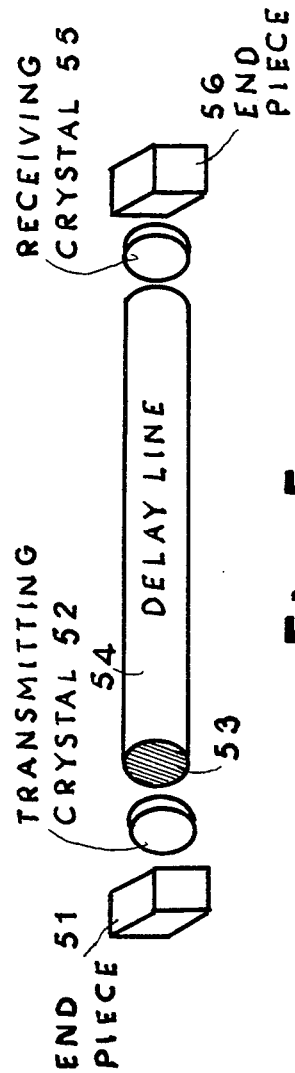
Fig. 4
Fig. 5

RADAR SEISMOGRAPH IMPROVEMENT

BACKGROUND OF THE INVENTION

This invention is an improvement in my earlier original invention for which a patent application was filed Mar. 20, 1981, Ser. No. 245,945. The original invention makes use of the technologies of radar, exploration seismology and air transportation to provide a highly-mobile and economical system of geophysical exploration for petroleum and other minerals. Use is made of the Seismo-electric (SE) and Electro-seismic (ES) effects to momentarily alter the absorption in, and reflection or scattering from, the earth's surface of electromagnetic (radar) waves transmitted from, and received by, an aircraft, to thereby modulate seismic information on the reflected, scattered and received waves. The present invention applies the same basic apparatus as the original invention and, additionally, provides a great improvement in how the useful seismically-modulated radar wave signals are separated from the bulk reflected and scattered electromagnetic wave signals which might otherwise mask the smaller seismically modulated responses.

In the original invention, several methods and means of cancelling, or nulling, the bulk reflections were provided. In all of these a phase and amplitude balance was obtained as the radar scanned the terrain being explored, prior to the initiation of seismic responses; i.e., prior to dropping a weight or detonating an explosive charge, and the bulk reflections and scatterings thereby nulled in the receiving apparatus.

It is clear that the goodness of these methods and means depends upon the goodness of the phase and amplitude balance that can be obtained (the null). Since the balance is over at least one complete scan of the radar antenna (Practically, it is over many complete scans.), it is a broad average null covering a relatively large surface and, as such, cannot possibly be as good as might be desired. The most desirable arrangement would be one wherein the balance (the null) was automatically obtained for each and every small segment of the scan of the radar antenna. This kind of balance, or null, would then leave only the seismic response of each small segment of earth surface to be received, amplified, processed, and passed to form PPI pictures and recorded for additional processing at a later time. The object of this invention is to provide method and means whereby this ideal result is obtained.

BRIEF DESCRIPTION OF THE DRAWINGS

FIG. 4 is an electrical block diagram of the original system with the features of the present invention added.

FIG. 5 shows the construction of a typical delay line used in the present invention.

DETAILED DESCRIPTION OF THIS INVENTION

Figure 1:
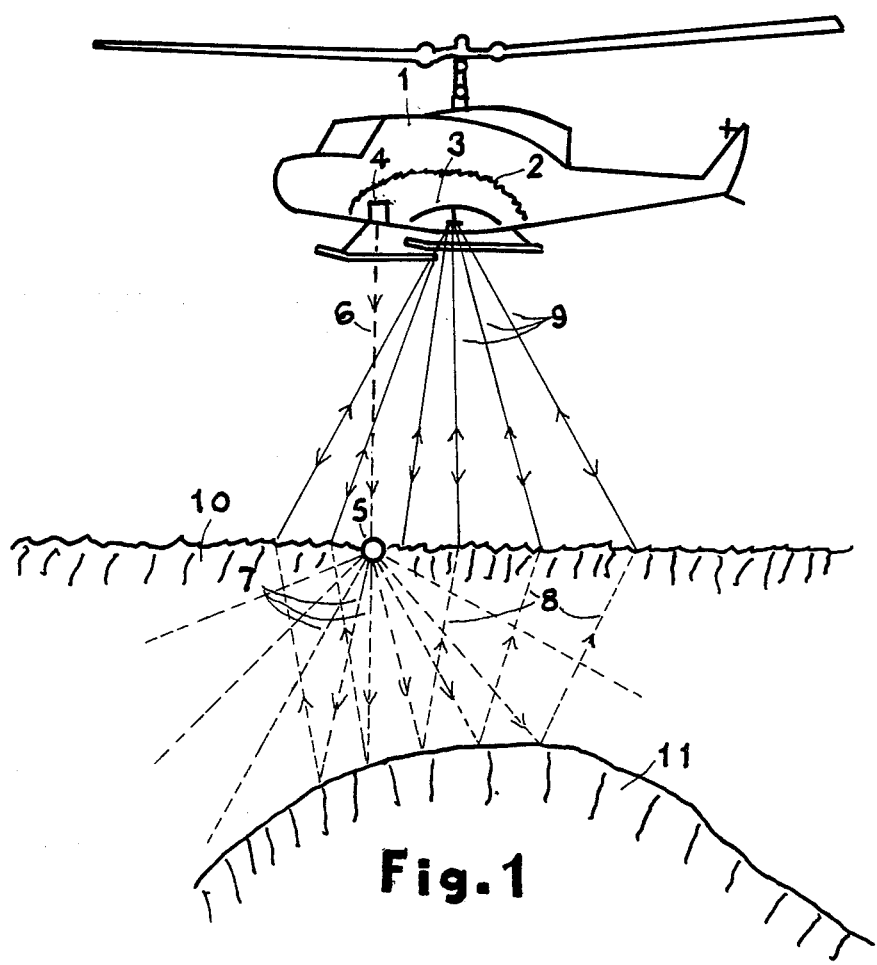
FIG. 1, taken from Ser. No. 245,945, is a drawing outlining the preferred general system and method of the original invention and hence also of the present invention.

Referring to FIG. 1 in detail, 1 is the helicopter, or other aircraft, which transports most of the apparatus of the invention: the transmitting, receiving, nulling, displaying and recording apparatus of FIG. 4, as well as means of exciting elastic waves in the earth, comprising a tube, or gun, 4, shown in the cutaway 2, from which a projectile 5 is dropped or shot against the earth below. The cutaway 2 also symbolically shows the radar antenna 3 which alternately directs the transmitter radio waves against the earth and alternately receives the waves that are reflected or scattered back from the earth's surface. The remainder of the radar and recording apparatus is carried within the body of the aircraft but not shown.

As in the original invention, the projectile 5 is launched from 4 along a path 6 and strikes the earth 10, the impact of which deforms the earth at the point of contact and excites elastic waves, represented by the rays 7, some of which strike the subsurface structure 11 and are reflected back to the surface as rays 8. These, in turn, produce cyclical compressions and rarifactions of the soil at the surface and hence variations in the surface electrical conductivity as measured by Blau, Stathan (U.S. Pat. No. 2,054,067) and others. In all measurements, the cyclical variations in electrical conductivity, the SE-effect, were well above the noise level.

As practiced in the original invention, a broad nulling of reflections, prior to initiating a seismic response, would preferably first be obtained for an area being surveyed by one or more of the methods and means outlined in the original disclosure. The additional facilities of FIG. 4, items 34, 35, 36, and 37, would then be automatically utilized to obtain greatly improved results, as subsequently described.

Figure 2:
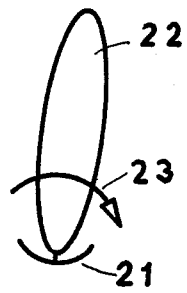
FIG. 2 is a sketch showing a typical scanning lobe of radiation as it is emitted from the rotating radar antenna of the present invention.
Figure 3:
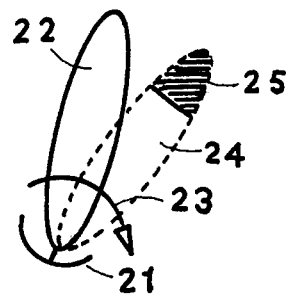
FIG. 3 is a sketch illustrating the composite scan of the present invention.

First, refer to FIGS. 2 and 3 for the principles being applied. There, 21 is the radar antenna, 22 is a representative lobe of radiation emitted by 21, and 23 is an arrow indicating the rotation of the antenna, and hence also, the movement of the scanning lobe 22. Whereas FIG. 3 shows two lobes, the radar antenna produces only one lobe, as in FIG. 3; what is shown in FIG. 3 is a sequence of lobe positions wherein the broken-line lobe 24 is the position of the incident radiation at time T; whereas, the solid-line lobe 22 is the position of the lobe at time T-t; in other words, the two lobe positions are separated by a time interval, or period, t. If during this time, the seismic wave advances a distance, d, producing SE- and ES-changes in conductivity and dielectric responses, respectively, the reflection of the radar wave will change slightly during the time, t; and if we somehow bring the responses into opposition what essentially will be left are the reflection and scattering differences produced by the seismic disturbances in the small shaded area, 25, where the lobe of radiation intercepts the earth surface.

To accomplish this objective, it is obvious that the reflection of lobe 24 must be delayed by time, t, in the receiving and processing apparatus, so that the reflection of lobe 22 can be put in opposition thereto, and this is the essence of what has been added to the original invention.

Referring again to FIG. 4, 34 is the Delay Mechanism by means of which the time delay, t, is obtained; 35 represents the Direct Path of the signal into Subtractor 36 where it is combined in opposition to the delayed signal via 34. Thus, what is passed on to Rectifier 37, as the Radar Antenna 3 rotates, is the video representation of the differences in radar reflections occuring during the interval, t. After rectification in 37 what then is passed along to the PPI and Recorder is the electrical representation of the difference in seismic wave compressions and rarefications occuring during the time, t; which is to say: the seismic responses by means of which geological structure is manifest. The requirements are similar to those of Dopler Radar which is used to observe small moving objects in space, except we aren't observing directly the microscopic movement of the earth surface; rather, we are observing the variations in the conductive and dielectric properties of the earth's surface produced by the microscopic motions of the ions and particles responsible for the these electrical properties.

It would be most desirable to delay the reflection of lobe 24 by electromagnetic means but this turns out to be highly impractical. For example, if the seismic disturbance is travelling at a velocity of 5,000 ft./sec., and the radar reflection is confined to the first foot of earth surface, the optimum time, t, will be of the order of 200 micro-seconds. An electromagnetic wave in free space (essentially the same along a conductor in air) will travel at the rate of $982 \times 10^6$ ft./sec., approximately $10^9$ ft./sec. Thus, an electromagnetic delay line would have to be 200,000 ft. long, and such a line, considering both bulk and weight, would be highly impractical to transport in a helicopter or other small aircraft; moreover, the attenuation of such a line would be of the order of several hundred Db.

Fortunately, as has been done in Dopler Radar and similar devices, an acoustic delay line can be substituted for an electromagnetic delay. Since the velocity of propagation of acoustic waves is much less than the velocity of propagation of electromagnetic waves, a delay line of reasonable proportions becomes available. This adaptation of the present invention is shown in FIG. 4. The reflections are picked up by Antenna 3, which in a pulsed radar can be used in common with for the functions of receiving and transmitting; or a separate antenna for receiving can be provided. In any event, the reflection signals in the receiving mode are transformed into electric currents by the antenna and are passed to Receiver 33 where they are selected and amplified, and the receiver output divided into a Direct Path 35 and into a path through Delay Mechanism 34. The two out-phased signals are then joined in Subtractor 36 and the difference in signals, that part representative of the seismic disturbance, passed to Rectifier 37 and thence to the PPI Display Unit 38 and Recorder 39. Thus, the discrete reflections (what is left of them considering prior cancellation in Receiver 33 of bulk reflections, with the help of Phase & Amplitude Network 32) from each small segment of terrain are process together, masking reflections further removed and the seismically-produced variations preserved.

In the radar science of the 1960s, at least 40 Db additional selectivity could be obtained by the method and means of comparing delayed and direct-path signals. Since the delay required by the present invention is about ten times less than in the usual Dopler Radar; since 30 to 40 Db selectivity can be obtained by the nulling methods of the initial invention; i.e., the application for example, of 32, FIG. 4, to the selection processes of Receiver 33; and since many improvements have been made since 1960 in selecting and amplifying the weak signals of space probes, it appears that at least 80 Db selectivity can be obtained by applying the advanced art of electronics to the present invention; i.e., selecting and processing differences of the order of one part in ten thousand. The big advantage here, however, is that we can make nulling balances for small terrain segments, the exact size used under conditions of seismic disturbances, rather than balances obtained during complete scans of an entire area.

The construction of a typical acoustic delay line is shown in FIG. 5. The transmitting and receiving crystals, 52 and 55, respectively, are piezoelectric devices which transform electric currents into mechanical motions, and mechanical motions into electric currents. They are cemented to Delay Line 54 by means of a suitable adhesive, as indicated by 53, and Delay Line 54 may be a rod of quartz, aluminum, etc., or a more complicated multiple-reflecting body well known to the art. The end pieces, 51 and 56, are reflecting and/or absorbing bodies used to make better impedance matches of the crystals 52 and 55 to Delay Line 54, as well as help attenuate unwanted side effects.

To assist in making the two transmission paths of FIG. 4 as identical as possible, and thereby perfecting good balances, I propose putting a delay line in each path, one having a 200 micro-second, or thereabouts, greater delay than the other. This can be accomplished by making one delay rod longer than the other, or in multiple-reflecting bodies, by providing fewer reflection paths in one than in the other. In this way, the transmission paths are made identical except for effective lengths, and hence better balances more readily obtained.

The delay line, or lines, are operated at some I-F or video frequency out of the receiver, in the range 5-60 Mhz., for example.

Considering the radar scanning frequency that might be required by the proposed system, suppose that a sector width of 6° is used; i.e., the scanning beam, or lobe, moves 6° in 200 micro-seconds, or 360° in 12,000 micro-seconds. This results in a repetition rate of 83.33 r.p.s. = 5,000 r.p.m., and this is a rate consistent with the observation of seismic wave travel in the earth's surface.

To be most effective, the time delay, t, of one signal path must be such that when the signals of this path are combined with the signals of another path, the reflections from identical, or nearly identical, earth surfaces are nulled, as already pointed out. In view of the fact that the observing platform (helicopter, airplane or space ship) is moving it is of course literally impossible to present absolutely identical earth surfaces for nulling on successive scans of the radar antenna. The best we can do is provide identical sectors for nulling; however, an aircraft travelling at 200 miles/hr. would move only 0.704 inches in 200 micro-seconds, and this is quite insignificant. Other speeds and distance would be proporational.

If the time delay, t, is 200 micro-seconds, as an example, and identical sectors are scanned each revolution, the radar antenna must scan 360° of azimuth in each 200 micro-second period, or rotate at a frequency of 5,000 r.p.m. Thus, an electronic antenna and related scanning mechanism would be required.

With the time delay, t, fixed, the simplest mode of operation, the frequency of the energy applied to the azimuth and elevation controls of an electronic antenna would need to be adjustable, set at $f=1/t$, and locked in.

Figure 6:
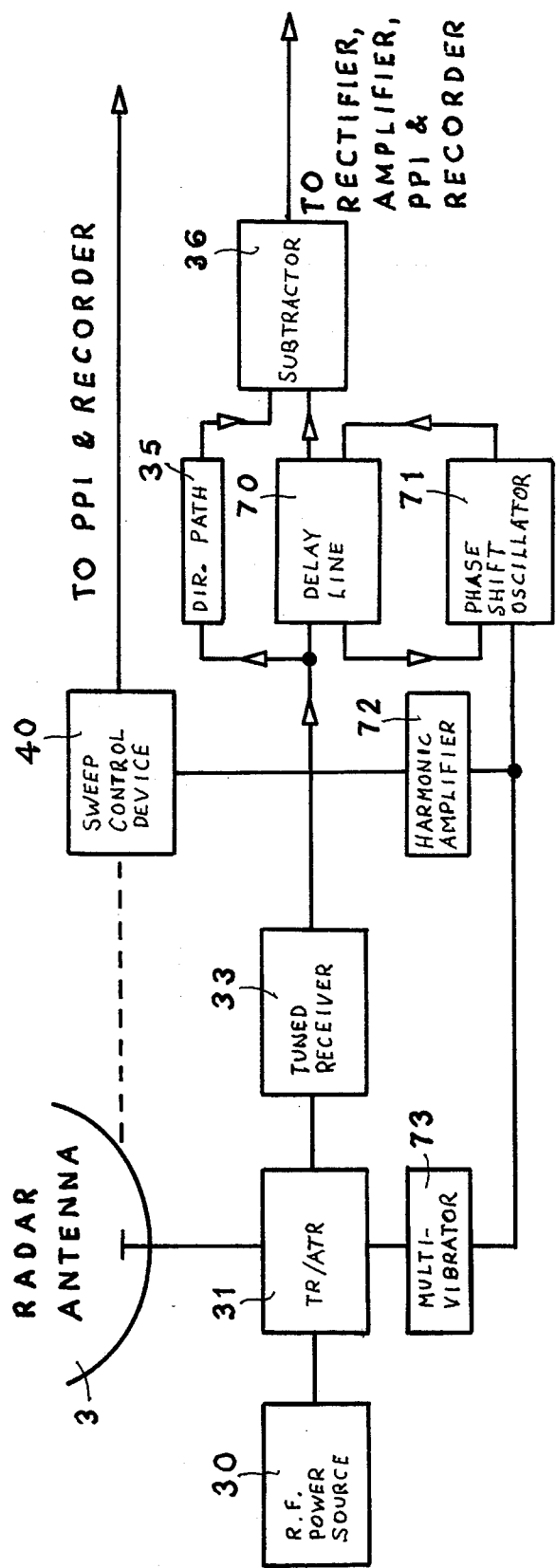
FIG. 6, similar to FIG. 4, is an electrical block diagram of the improved system with automatic features of time delay and radar scanning time added.

I propose accomplishing this by incorporating the Delay Mechanism 34, FIG. 4, into the feedback mechanism of the sweeping Azimuth Control Oscillator, as disclosed in FIG. 6, so that the Delay Mechanism comprises a half-wave-length of the azimuth sweeping frequency, for example. Considering the Delay Mechanism 34 to be Delay Line 70, FIG. 6; and in view of the fact that the I-F or video signal frequencies of the radar system, and the frequency of the azimuth sweep, are far apart, as 5–60 Mhz compared with 5 Khz, Delay Line 70 can be used in common by merely providing two sets of piezoelectric crystals to activate the delay line and receive corresponding motions at the terminal end.

Referring to FIG. 6 for appropriate details, numerals 3, 30, 31, 33, 36 and 40 refer to units previously described in connection with FIG. 4. 70 is the multiply-used Delay Line as set forth above, and 71 is a Phase Shift Oscillator such as that of FIG. 24 (c), page 505, of Terman's Radio Engineer's Handbook, typical of the vacuum-tube era and often employed in audio and low-frequency generators. In the present application, Delay Line 70 replaces the tripple-section RC-network of Terman's oscillator and provides 180° phase shift in the feedback path from plate to grid. Alternatively, more modern solid-state forms of generators may be used, and any required additional gain to overcome losses in the delay line also provided. The cardinal principle is that Delay Line 70 must provide 180° of phase shift (or some integral number of degrees which divide evenly into a full cycle of 360°) so that a one-on-one correspondence can be maintained for the Sweep Control Device 40 of Radar Antenna 3, using harmonic amplifiers as may be required.

When the phase shift is 180°, the output of Phase Shift Oscillator 71 is fed into Harmonic Amplifier 72 where the second harmonic of the oscillator fundamental frequency is selected, suitably amplified and passed to the Antenna Azimuth Controls of Sweep Control Device 40. In this way, the sweep of the antenna is sychronized with the video delay time, t, so that regardless of how much delay is chosen the period of the antenna sweep, and the video delay time, t, are one and the same thing. Obviously, the sweep of the antenna elevation controls can be synchronized in the same way. Thus, identical sectors of the earth's surface and, in so far as the aircraft's movements during time t do not contribute significantly to the motion, identical intercept surfaces 25, FIG. 3, will be progressively compared, the unwanted reflections and scatterings cancelled in Subtractor 36, leaving only the differences in reflections and scatterings that are produced by the seismic signals as they move to the surface.

The actual delay time, t, can be chosen to best reveal seismic information and modulate it upon the radar signal; as, for example, making it equal to the period of a half-cycle of the predominate component of the seismic wave. If this component is 100 Hz, say, the delay time, under this assumption, would want to be 5,000 micro-seconds rather than 200 micro-seconds. Such might possibly provide the greatest contrast; however, delays of this magnitude are difficult to obtain. Multiple reflection delay lines, such as those of FIGS. 4.9 and 4.10, Skolnik, "Introduction to Radar Systems," McGraw-Hill Book Co., N.Y., 1962, would probably need to be used. It might be better to base the delay time on the anticipated depth of penetration of the r dar wave into the earth, as proposed in the foregoing. Fundamentally, it is only essential that the time delay be long enough that significant changes in earth conductivity and/or dielectric properties, are produced by the seismic wave during the time of an antenna sweep. It matters not how many sweeps are required to develop the greatest contrast as long as significant information is provided by each sweep. This information can all be stored on a tape and developed and analyzed later.

The output of the Phase Shift Oscillator 71 can further be applied to the TR/ATR Switch 31, if desired, to synchronize the radar pulse periods with the delay time, although such is by no means necessary. In this instance, the oscillator output might be applied through either a harmonic amplifier, as for the sweep, or through a multi-vibrator, 73, or like device, depending upon the delay time, t, that is used, and whether the TR/ATR is operated on a harmonic or sub-harmonic of the oscillator frequency.

With the foregoing sensitive method and means of comparing successive reflections and/or scatterings of radar waves from specific segments of the earth's surface, due to the variations in surface conductivity and dielectric properties caused by the SE- and ES-effects, the source of the seismic disturbance producing the seismic waves is immaterial. A weight can be dropped; an explosive charge detonated, or use can be made of naturally occuring phenomena such as earthquakes (particularly the after shocks), volcanoes, or even ocean waves beating on the shore. Too, use can be made of large man-made disturbances such as those produced nuclear explosions or the launching of rockets and spacecraft, providing the efforts are appropriately coordinated.

What is claimed is:
1. A method of geophysical exploration, comprising:
    (1) generating elastic waves in a localized area of the earth, the elastic waves being reflected from subterranean formations, the reflected elastic waves producing seismo-electric effects whereby the earth's electrical conductivity, including that adjacent the earth's surface, is affected;
    (2) transmitting electromagnetic waves from a position above the earth to impinge upon the earth in said localized area;
    (3) receiving at a position above the earth's surface electromagnetic waves as reflected and modified by said seismo-electric effect in said localized area; and
    (4) deriving from said received electromagnetic waves indications of said subterranean formations.

2. The method of claim 1 wherein the step of transmitting electromagnetic waves includes transmitting said waves in a pattern which progressively scans said earth's surface.

3. The method of claim 1 wherein the step of receiving reflecting electromagnetic waves includes transmitting and receiving said waves in a pattern which progressively scans said earth's surface.

4. The method of claim 1 wherein said steps are carried out from an aircraft positioned above said earth surface.

5. The method of claim 1 wherein said elastic waves are generated by means under the control of apparatus in an aircraft.

6. The method of claim 1 wherein said elastic waves are generated by means dropped from an aircraft.

7. The method of claim 3 wherein said scanning pattern is continuously repeated, with a specific time period between repeated positions, so that individual sectors of the earth's surface are repeatedly examined at selected time intervals.

8. The method of claim 1 wherein step (4) includes converting said received electromagnetic waves into electrical currents and processing said electrical currents to enhance differences of electromagnetic reflection in response to differences in the electrical conductivity of the earth's surface as produced by differences in the strength of said elastic waves.

9. The method of claim 8 wherein said electric currents are divided into two transmission paths, one of which has a substantially longer time of transmission than the other; and
   combining said divided electric currents in a subtracting device to enhance differences of detected electromagnetic reflection to minimize the effects of electromagnetic wave reflection having no relationship with said elastic waves, and thereby to derive from received electromagnetic waves indications of the structure of the earth's subsurface formations in the earth wherein elastic waves are generated and transmitted.

10. The method of claim 9 wherein said selected time period is equal to said longer time of transmission.

11. The method of claim 9 wherein said scanning pattern is synchronized with said longer time of transmission.

12. A system for use in conducting geophysical exploration, comprising:
   means for generating elastic waves in a localized area of the earth, the elastic waves being reflected from subterranean formations, the reflected elastic waves causing changes in the electrical conductivity at and adjacent the earth's surface;
   means of transmitting electromagnetic waves from above the earth's surface to impinge upon the earth's surface, at least a portion of such electromagnetic waves being reflected, the portion being reflected being affected by the earth's conductivity at and adjacent the earth's surface as affected by said reflected elastic waves; and
   means for receiving and recording said reflected electromagnetic waves which can be used to provide an indication of said subterranean formations.

13. A system for geophysical exploration according to claim 12 wherein said electromagnetic waves are used as a modulated carrier of elastic wave information and wherein said means of transmitting and said means of receiving electromagnetic waves comprises:
   antennae means which project electromagnetic waves from a radio-frequency power source against said area of the earth and which receives electromagnetic waves reflected and scattered back from said earth surface;
   means associated with said antennae and said transmitting equipment for forming said electromagnetic waves into a beam and steering said beam in a pattern over said earth's surface;
   said means of receiving said reflected electromagnetic waves including selection, transduction, demodulation and amplification associated with said antennae and said means for forming and steering said beam of electromagnetic waves to produce electrical signal currents representative of said elastic wave information;
   means for nulling said electrical signal currents before said means of generating elastic waves has been activated; and
   means to time, measure, correlate, display and record seismic information represented by said electrical signal currents after said source of elastic waves has been activated.

14. A system for geophysical exploration as in claim 13 wherein said means for nulling said electrical signal currents comprising a phase and amplitude network, with adjustable phase and amplitude controls, the input of said network being connected to said radio-frequency power source, the output of said network being connected to said receiving means, and means of adjusting said phase and amplitude controls until a null is obtained in said equipment to time and measure said electrical currents before said source of elastic waves has been activated.

15. A system for geophysical exploration as in claim 13, wherein said means for nulling said electrical signal currents comprises:
   means for separating said electrical signal currents into two transmission paths, one of which includes time-delay means, to produce two signal portions, one of which is delayed in time with respect to the other; and
   recombination means for comparing said signal portions and producing a resultant signal that is the difference between the two signal portions.

16. A system for geophysical exploration as in claim 15 wherein said time-delay means comprising an acoustic delay line.

17. A system for geophysical exploration as in claim 16 wherein said delay line is used conjointly by a phase-shift oscillator to determine the frequency of said oscillator, said oscillator controlling said means for steering said beam of electromagnetic waves over the earth's surface to synchronize the movement of said beam with said delay time to said electronic signal portion.

18. A system for geophysical exploration as in claim 15 in which both of said paths of transmission have time delay means, one of which provides a greater delay than the other.

19. A system for geophysical exploration as in claim 18, in which both time delay means comprise acoustic delay lines which are identical in all structures except length.

20. A system for geophysical exploration as in claim 17 in which said phase-shift oscillator employs said delay line as a half-wave-length feedback device, and the path connecting said oscillator and said means for steering said beam of electromagnetic waves including a harmonic amplifier.

* * * * *